United States Patent
Murphy (10) Patent No.: US 6,388,842 B1
(45) Date of Patent: May 14, 2002

(54) DISC DRIVE SUSPENSION BEND SECTION AND METHOD

(75) Inventor: James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/568,746

(22) Filed: May 11, 2000

Related U.S. Application Data (60) Provisional application No. 60/133,832, filed on May 12, 1999.

(51) Int. Cl.$^7$ .............................. G11B 5/58; G11B 5/54; B21D 11/10

(52) U.S. Cl. ............................... 360/244.8; 29/603.03; 72/16.3

(58) Field of Search ........................... 360/244.2, 244.8, 360/244.9, 245.2, 294.7; 29/603.03; 72/16.3, 16.9, 21.4, 30.2, 342.1, 342.5, 342.6, 342.94

(56) References Cited

U.S. PATENT DOCUMENTS

| | | | | |
|---|---|---|---|---|
| 4,204,235 A | * | 5/1980 | Stollorz ..................... 360/244.9 |
| 4,603,567 A | * | 8/1986 | Smith et al. ................. 72/16.9 |
| 4,991,045 A | | 2/1991 | Oberg ...................... 360/244.3 |
| 5,265,325 A | * | 11/1993 | Fortin ........................ 29/742 |
| 5,297,413 A | * | 3/1994 | Schones et al. ............ 72/342.1 |
| H1425 H | * | 4/1995 | Wolter ..................... 360/245.3 |
| 5,459,921 A | * | 10/1995 | Hudson et al. ........... 29/603.03 |
| 5,465,477 A | * | 11/1995 | Tucker ..................... 29/603.03 |
| 5,471,734 A | | 12/1995 | Hatch et al. .............. 29/603.09 |
| 5,594,607 A | | 1/1997 | Erpelding et al. ........ 360/244.3 |
| 5,638,234 A | | 6/1997 | Hagen ..................... 360/245.5 |
| 5,734,525 A | * | 3/1998 | Girard ...................... 360/244.8 |
| 5,734,526 A | * | 3/1998 | Symons ................... 360/244.9 |
| 5,844,752 A | | 12/1998 | Bozorgi et al. ........... 360/244.9 |
| 5,850,319 A | * | 12/1998 | Tangren .................... 360/244.9 |
| 5,894,381 A | | 4/1999 | Allen et al. .............. 360/244.9 |
| 5,898,543 A | * | 4/1999 | Jagt et al. ................. 360/244.8 |
| 5,914,835 A | * | 6/1999 | Girard et al. ............. 360/244.8 |
| 5,943,761 A | | 8/1999 | Tucker et al. ............. 29/603.03 |
| 5,995,335 A | * | 11/1999 | Jurgenson et al. ........ 360/244.8 |
| 6,011,239 A | * | 1/2000 | Singh et al. .............. 219/121.6 |
| 6,215,625 B1 | * | 4/2001 | Carlson ................... 360/244.7 |

FOREIGN PATENT DOCUMENTS

JP 63-303237 * 12/1988

\* cited by examiner

*Primary Examiner*—David L. Ometz
(74) *Attorney, Agent, or Firm*—John B. Phillips; Merchant & Gould P.C.

(57) ABSTRACT

A disc drive suspension incorporates a loadbeam with a shorter bend section having higher torsional stiffness and higher-frequency resonance states than conventional suspension bend sections. The bend section is formed by etching a narrow groove in the loadbeam. The suspension may also include a separate bend section piece that bridges a gap between the loadbeam anchor sheet and the loadbeam. A method of performing a pre-load adjustment on a transducer suspension for use in a disc drive includes attaching a loadbeam anchor sheet of the suspension to an actuator arm of an E-block to form part of an actuator assembly, measuring a pre-load force on the suspension on the actuator arm, back-bending the suspension until the bend section yields and measuring the pre-load force on the suspension on the actuator arm.

26 Claims, 9 Drawing Sheets

DISC DRIVE SUSPENSION BEND SECTION AND METHOD

RELATED APPLICATIONS

This application claims the benefit of priority of U.S. Provisional Patent Application Serial No. 60/133,832 entitled "YIELDING BEND SECTION SUSPENSION," filed May 12, 1999.

FIELD OF THE INVENTION

This application relates to magnetic disc drives and more particularly to a disc drive having a yielding bend section in an actuator arm suspension.

BACKGROUND OF THE INVENTION

Disc drives are data storage devices that store digital data in magnetic form on a rotating information storage disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers or "heads" fixed to a slider mounted on a radial actuator arm for movement of the heads in an arc across the surface of the discs.

The actuator arms are driven by an actuator assembly located adjacent to the disc(s) in the disc drive. The actuator assembly includes an E-block that attaches to a plurality of actuator arms. One or more suspensions are attached to the distal end of each actuator arm, where each suspension includes a base-plate for securing the suspension to the actuator arm and a rigid loadbeam for supporting each head of the disc drive above the disc. Suspensions are formed with a bend section that exerts a pre-load force on the head toward the disc.

Each of the concentric tracks is generally divided into a plurality of separately addressable data sectors. The recording transducer, e.g. a magnetoresistive read/write head, is used to transfer data between a desired track and an external environment. During a write operation, data is written onto the disc track and during a read operation the head senses the data previously written on the disc track and transfers the information to a host computing system. The overall capacity of the disc drive to store information is dependent upon the disc drive recording density. It is of particular importance in the disc drive art to maximize the disc drive recording density.

An important parameter affecting the recording density of a disc drive is the spacing between the head and the magnetizable medium layer of the information storage disc. This spacing is known as the head-to-media spacing. Closer head-to-media spacing allows for closer spacing of the magnetic signals, i.e., bits, recorded on the information storage disc which in turn allows for narrower track widths and consequent greater recording densities on the drive. As such, one way to maximize the disc drive recording density is to minimize head-to-media spacing.

However, there are at least two major shortcomings that exist in the art with regard to increasing disc drive recording density by decreasing head-to-media spacing. First, intrinsic spacing variations exist between the head and the magnetizable medium layer of the information storage disc. These variations result from, among other things, part-to-part variations in the pre-load force applied to the head by the suspension structure. Pre-load force variations result from deviations in the suspension geometry, e.g., loadbeam thickness and pre-load bend angle, as well as to the assembly process of the suspension structure and E-block structure. As the head to media space decreases, a point is reached where the spacing variations induced by the suspension pre-load force become as great or greater than the head-to-media spacing itself and it becomes probable that a head will physically contact the surface of the disc. Thus, the intrinsic variations of the head pre-load force places a limit on the degree to which the head-to-media spacing can be reduced.

Second, by increasing the number of tracks on a disc and decreasing the head-to-media spacing, it becomes increasingly important to stably control the head over the track. Stable control of the head is directly affected by the presence of structural resonance within the actuator assembly, and in particular to resonance within the suspension structure of the actuator arm. Resonance within the suspension structure limits the ability of the head to properly operate within the confines of a target track. As the head-to-media spacing decreases with corresponding decreases in track width, resonance within the suspension becomes a correspondingly greater problem. Thus, there is a limit on how small the head-to-media spacing can become that is imposed by resonance within the suspension structure of the actuator arm. Against this backdrop the present invention has been developed.

SUMMARY OF THE INVENTION

In accordance with the present invention the above problems and others have been solved by incorporating a suspension into the actuator assembly that has a shortened, stiffer bend section, thereby increasing resonance frequencies of the suspension and allowing for reduced head-to-media spacing.

One embodiment of the present invention is a suspension that connects a slider to an actuator arm. The suspension has a loadbeam anchor sheet for operative attachment to the actuator arm, a bend section, and a loadbeam having a distal end for operative attachment to the slider. The bend section is between and connects the loadbeam anchor sheet to the loadbeam. The bend section is composed of a material that has undergone a stress relief operation while the suspension is attached to the actuator arm.

Another embodiment of the present invention is a method of performing a preload adjustment on a transducer suspension for use in a disc drive. The suspension includes a loadbeam anchor sheet, a bend section, a loadbeam and a slider attached to a distal end of the loadbeam. The method includes attaching the loadbeam anchor sheet of the suspension to an actuator arm of an E-block to form part of an actuator assembly, measuring a pre-load force and z-height of the slider on the suspension on the actuator arm and back bending the suspension until the bend section yields.

These and various other features as well as advantages which characterize the present invention will be apparent from a reading of the following detailed description and a review of the associated drawings.

DETAILED DESCRIPTION

Figure 1:
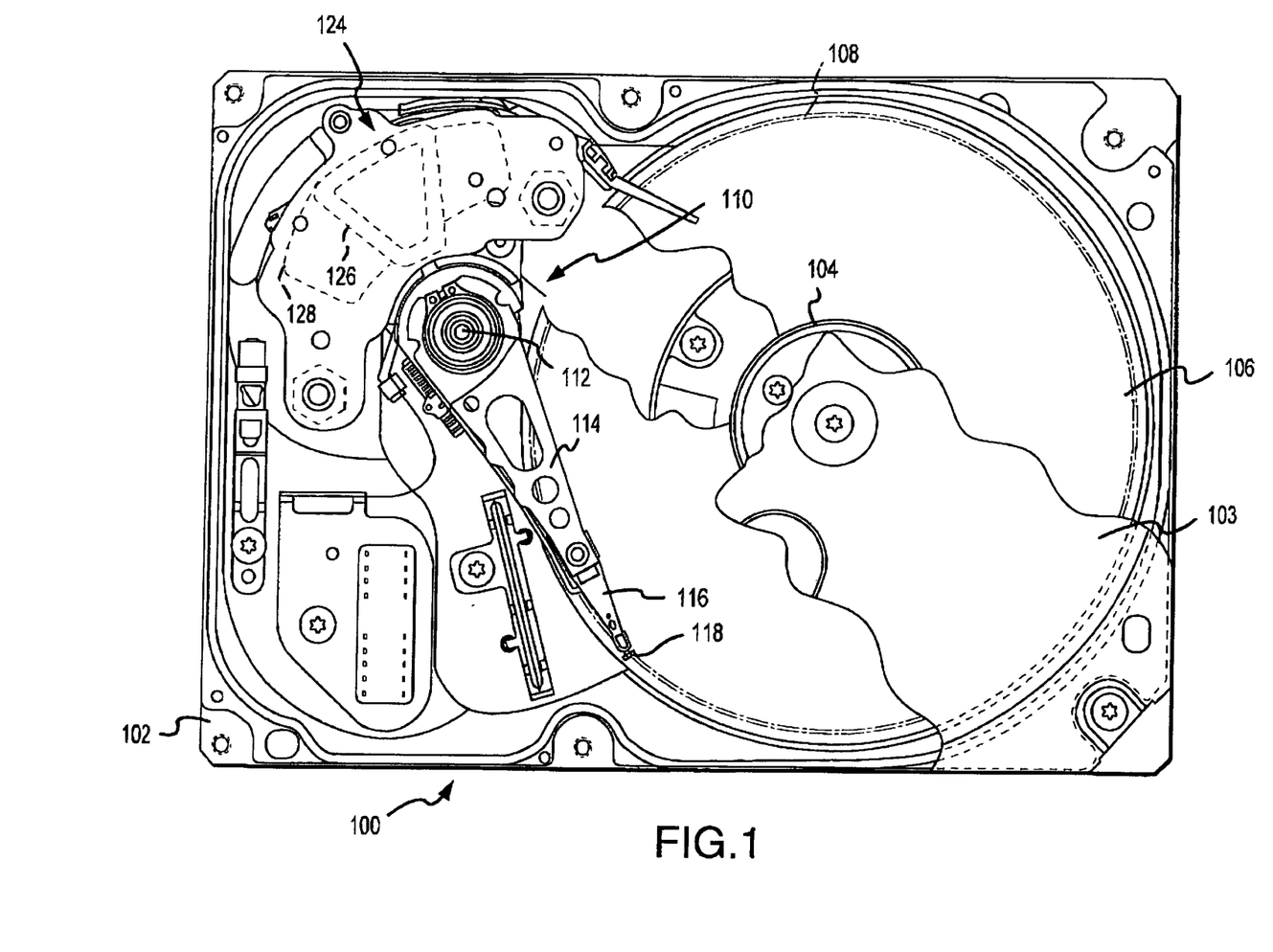
FIG. 1 is a plan view of a disc drive in accordance with a preferred embodiment of the invention.

A disc drive 100 constructed in accordance with a preferred embodiment of the present invention is shown in FIG. 1. The disc drive 100 includes a base plate 102 to which various components of the disc drive 100 are mounted. A top cover 103 cooperates with the base 102 to form an internal, sealed environment for the disc drive in a conventional manner. The components include a disc drive spindle motor assembly which includes a spindle motor 104 that rotates one or more information storage discs 106 at a constant high speed. Information is written to and read from tracks 108 on the discs 106 through the use of an actuator assembly 110 which rotates about a bearing shaft assembly 112 positioned adjacent the discs 106. The actuator assembly 110 includes an E-block 113 (FIG. 2) having a plurality of actuator arms 114 which extend towards the discs 106. One or more suspensions or flexures 116 extend from each of the actuator arms 114. Mounted at the distal end of each of the suspensions 116 is a head (transducer) 118 that includes an air bearing slider 120 (FIG. 3) enabling the head 118 to fly in close proximity above the corresponding surface of the associated information storage disc 106.

The air bearing slider 120 is typically formed from a ceramic block having a specially etched air bearing surface that forms an air cushion or "bearing" as the disc 106 rotates beneath the slider 120. The hydrodynamic lifting force provided by the air bearing surface acts against a downward pre-load force provided by the suspension 116, as will be discussed in greater detail below, to cause the slider to lift off and "fly" a very small distance above the surface of the disc as the disc spins up to its operating speed. This distance is referred to as the head-to-media spacing. Although the head-to-media spacing of the slider 120 is only a fraction of a micron, this thin film of air between the slider and the disc prevents damage to the fragile magnetic coating on the surface of the disc. As discussed previously, there is a need to minimize the head-to-media spacing distance between the slider and the disc in order to maximize the disc drive recording density.

The radial position of the slider 120 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the slider 120 and hence the heads 118 are caused to move across the surfaces of the discs 106.

Figure 2:
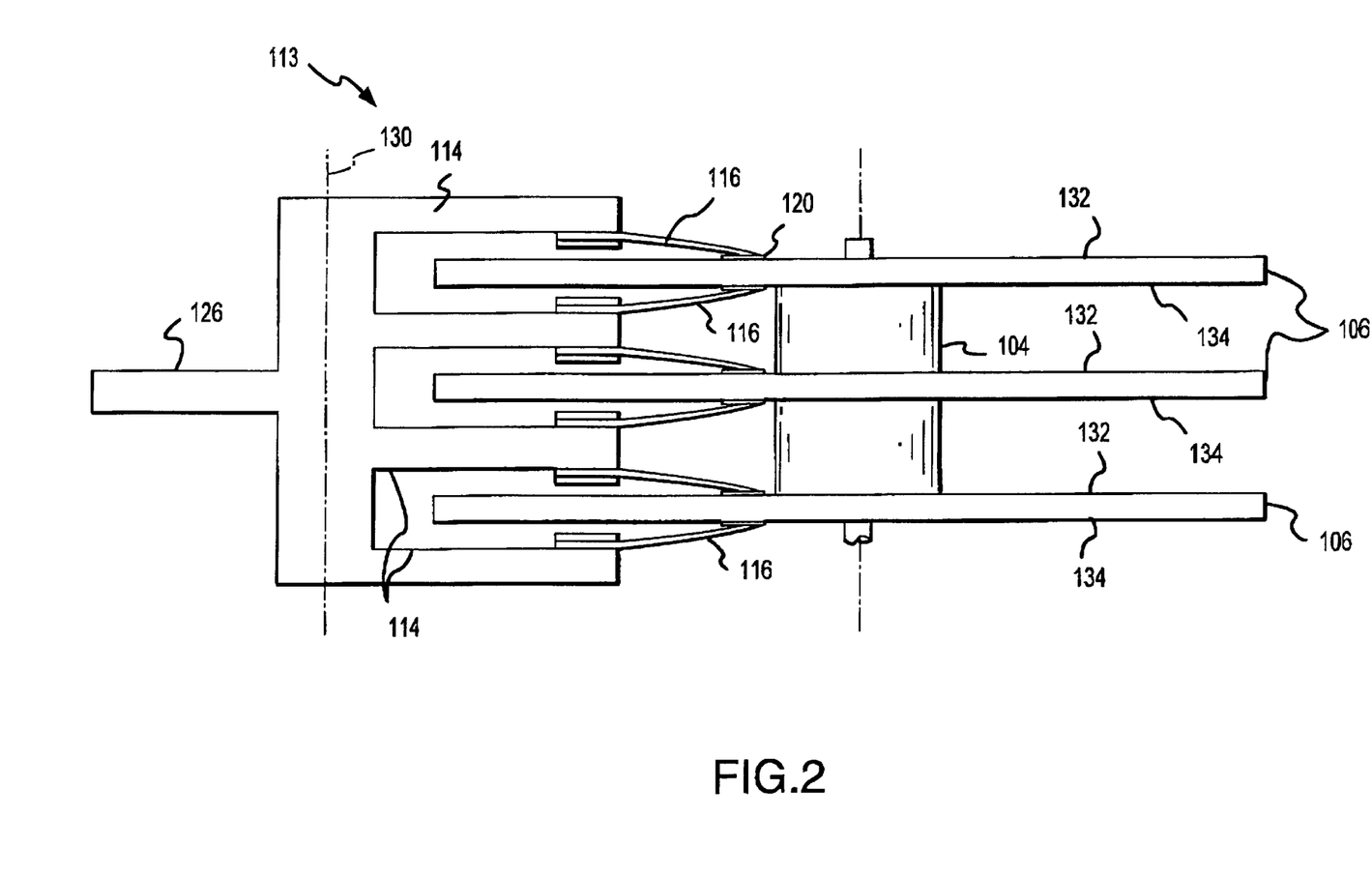
FIG. 2 is an elevated side view of three discs within the disc drive shown in FIG. 1, illustrating suspensions connecting sliders to actuator arms of an E-block.

The E-block 113 is shown in FIG. 2 centered on its vertical axis 130. The VCM coil 126 is secured to one side of the E-block 113, while a plurality of parallel, spaced-apart actuator arms 114 extends from the opposite side. The top and bottom actuator arms 114 each attach a single suspension 116 for holding a slider 120 with a predetermined pre-load force against the top 132 and bottom 134 surfaces of their respective discs 106, while one or more intermediate actuator arms 114 attach two separate suspensions 116 to the bottom surface 134 of one disc 106 and the top surface 132 of another disc 106 for the same purpose. In use, the E-block 113 is rotated by the voice coil motor 124 about its axis to move the sliders over the surfaces of the discs. Although several embodiments of the present invention are preferably described below with respect to use with a rotary voice coil motor, it is understood that the present invention may be used with any other actuator commonly utilized in disc drives. Further, while three discs 106 and six suspensions 116 are shown in FIG. 2, it is understood that the present invention may be beneficially used with any number of discs and corresponding suspension.

Suspensions 116 must be accurately positioned over the discs with a predetermined pre-load force in the downward direction, i.e., toward the disc 106. Suspension pre-load forces are determined and employed so that the air bearing slider 120 will attain an optimal head flying height, i.e., head-to-media spacing, above the surface of the disc 106 under normal operating conditions. It is the balance between the two forces imparted on the slider 120 (i.e., the force away from the disc 106 due to the rotational motion of the disc 106 versus the predetermined pre-load force toward the disc 106 from the suspension 116) that is manipulated to get the proper head-to-media spacing.

Figure 3:
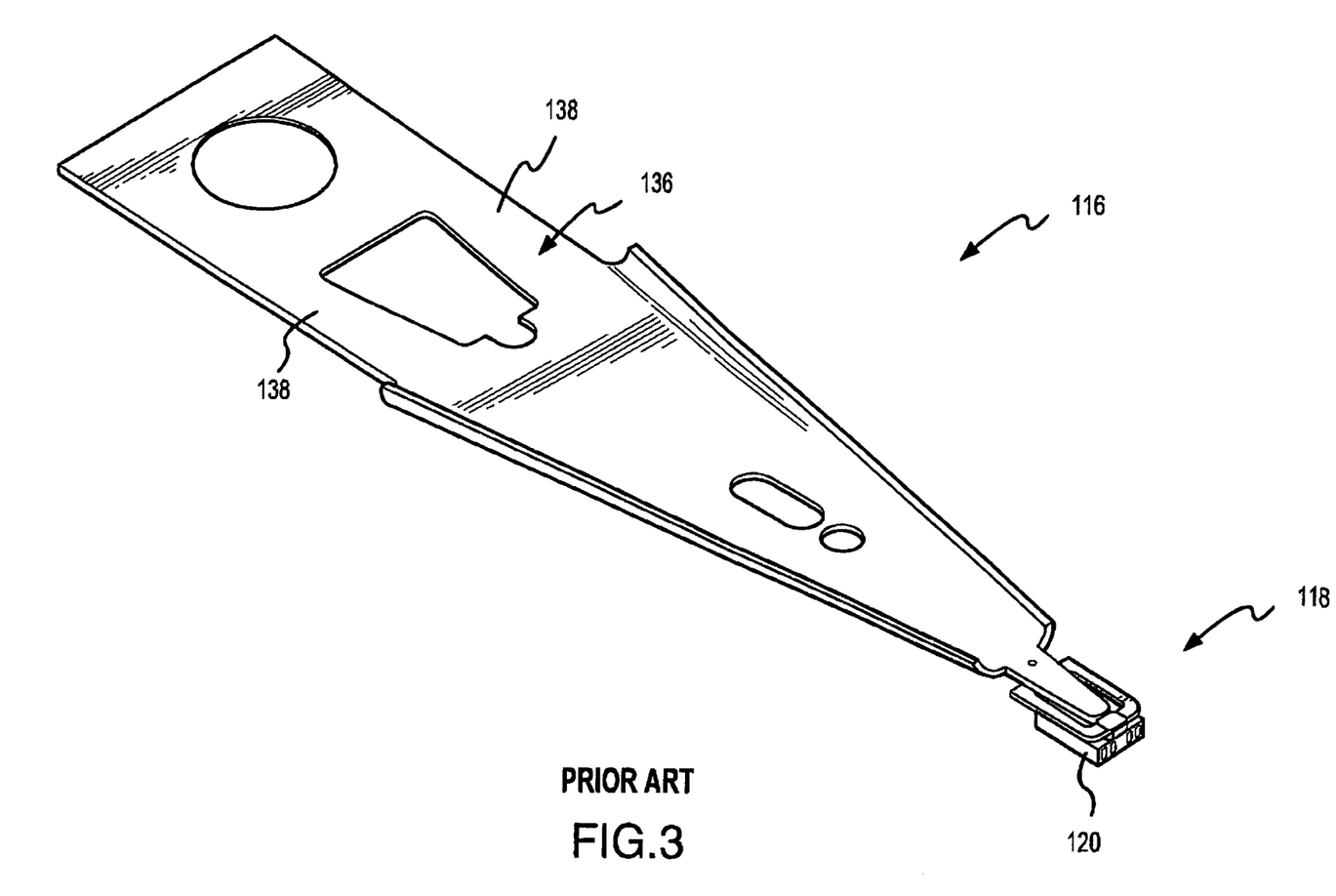
FIG. 3 is a perspective view of a prior art suspension and attached slider illustrating a prior art bend section.

Traditionally, the pre-load force is generated through the placement of a bend section or region 136 in the suspension 116 composed of two spring elements 138 that are bent downward, toward the disc 106, to provide a predetermined pre-load force to the suspension 116 and hence the slider 120 (FIG. 3). In order to minimize variations in pre-load on the head 118, the bend section 136 is typically designed to have relatively low spring rates, e.g., approximately 30 to 40 gram-force/inch (gf/in). Utilizing low spring rates in the bend section 136 is well known in the art to attain a proper pre-load force as the spring rate is directly proportional to the suspensions' pre-load tolerance, i.e., smaller spring rates result in more accurate final pre-loads on the head 118. However, a drawback of the bend section 136 having a lower spring rate is that the bend section 136, and hence the suspension 116, resonates at lower frequencies and thus is more difficult to stabilize over any given track 108. As such, there is a tension in the design of suspensions 116 between pre-load tolerance on the head 118 and resonance felt by the head 118. That is, the utilization of a suspension 116 with a low spring rate, and hence a more accurate pre-load tolerance, results in a suspension that resonates at lower frequencies under normal operating conditions and thus is more likely to have stability problems over any given track 108, especially in light of reduced head-to-media spacing.

Figure 4:
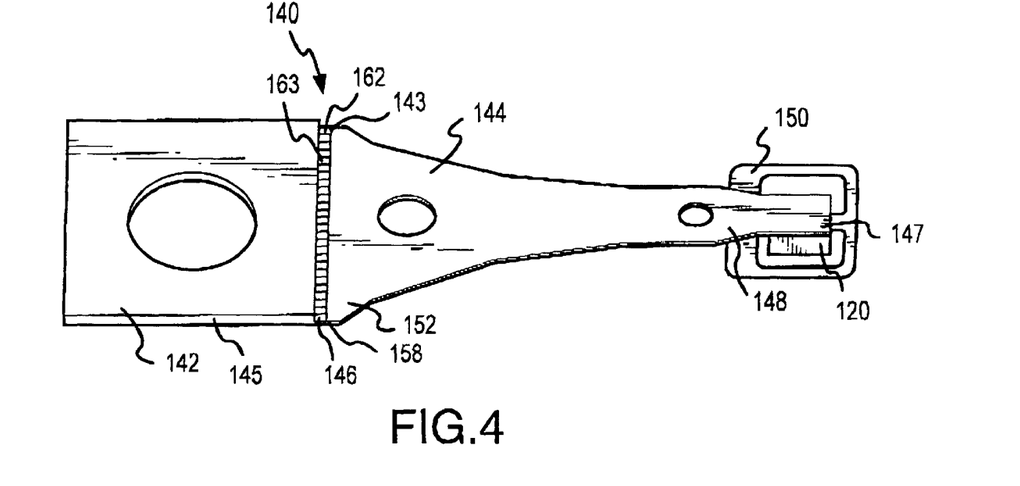
FIG. 4 is a perspective view of an embodiment of a suspension of the present invention showing a base-plate, loadbeam and bend section.

FIGS. 4–7 illustrate one preferred embodiment of the yielding bend section suspension of the present invention. Referring to FIG. 4, a suspension 140 having a loadbeam 144, loadbeam anchor sheet 145 and bend section 146 is shown. As in the conventional suspension 116 (FIG. 3), the loadbeam 144 is made of a relatively thin metal sheet, approximately 2.5 to 4 thousandths of an inch (mils) thick.

A base-plate 142, generally square shaped and modified for swaging the loadbeam to the actuator arm 114, is secured to the top surface of the loadbeam anchor sheet 145. The loadbeam extends laterally away from the base-plate 142 to form a rigid support or tongue 148 for a gimbal sheet 150 and air bearing slider 120 at a distal end 147 of the loadbeam (FIG. 3). The loadbeam 144 is generally of an elongated beam shape, having a wider first end 143 and becoming progressively narrower toward the distal end 147 that attaches to the slider 120. Preferably, the base-plate 142 and loadbeam anchor sheet 145 are secured to each other by welding, glue or other known attachment means. A ramp-load finger 160 (FIG. 7) extends from the distal end 147 of the loadbeam 144 for interacting with a ramp (not shown). The ramp-load finger may further be used to interact with a force measuring device as is discussed in greater detail below.

Unlike conventional disc drive suspensions, the bend section suspension 140 of the present invention are not dependent upon a bend section that utilizes a low spring rate. Rather, the bend section 146 of the present invention is designed to be shorter and stiffer than conventional bend sections (having spring rates anywhere from 30–40 gf/in to 150 gf/in). As shown in FIG. 4, one preferred embodiment of the bend section is a narrow, partially etched groove 162 formed across the loadbeam 144, in a region adjacent to the base-plate 142. The narrow etched groove 162 is shorter and stiffer than conventional suspension bend sections (e.g., the bend section 136 in FIG. 3) and thus exhibits higher torsional stiffness and higher-frequency resonance states than the more pliant bend section found in conventional suspensions. Thickness of the partially etched bend section 146 can vary dependent upon the thickness of the loadbeam. Thus, for instance, a loadbeam having 4 mils thickness will have a bend section etched to a thickness of not less than ⅕ the thickness of the loadbeam 144, and preferably between ¼ to ⅓ the thickness of the loadbeam 144. Alternatively, a loadbeam having 2 mils of thickness may define a bend section etched to a thickness not less than ⅓ the thickness of the loadbeam and preferably about ½ the thickness of the loadbeam. The etched groove may also define a series of perforations 163 to define or localize the yielding point of the bend section (see below).

Figure 5:
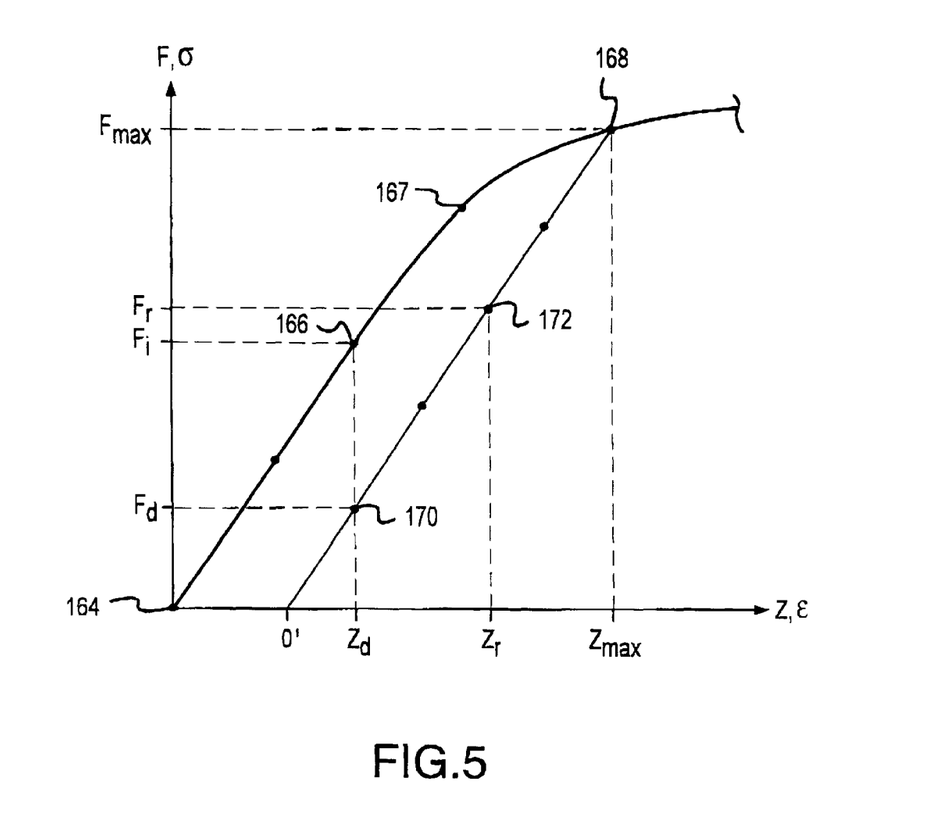
FIG. 5 is a force versus distance plot showing the yielding principle by which the appropriate pre-load force is generated by the suspension on a slider.
Figure 6A:
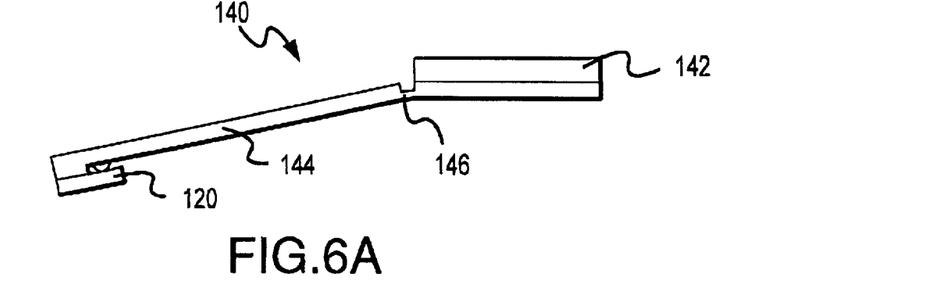
FIGS. 6A–6E are side views of a suspension showing representative back-bending positions of the suspension during a single suspension yielding cycle.
Figure 6B:
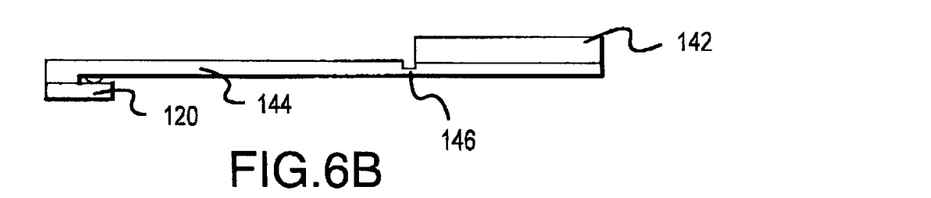
Figure 6C:
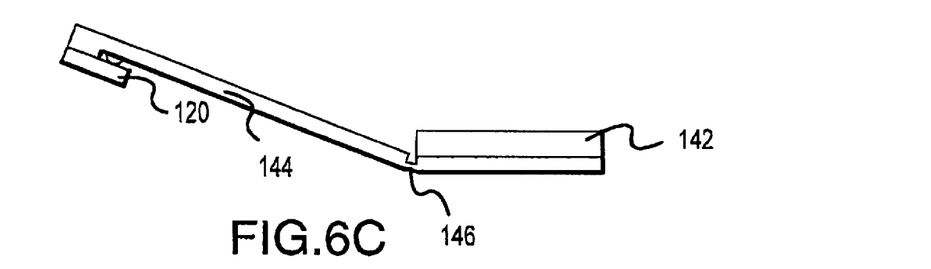
Figure 6D:
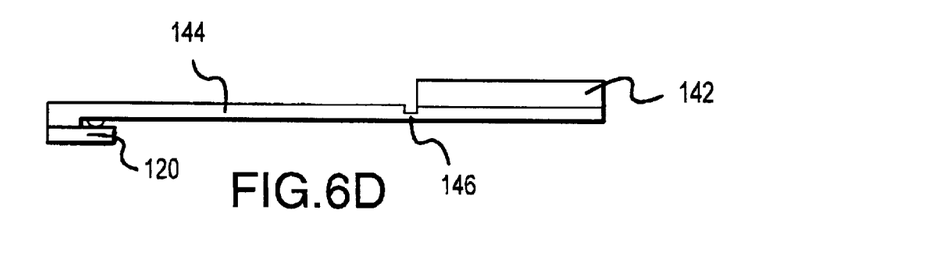
Figure 6E:
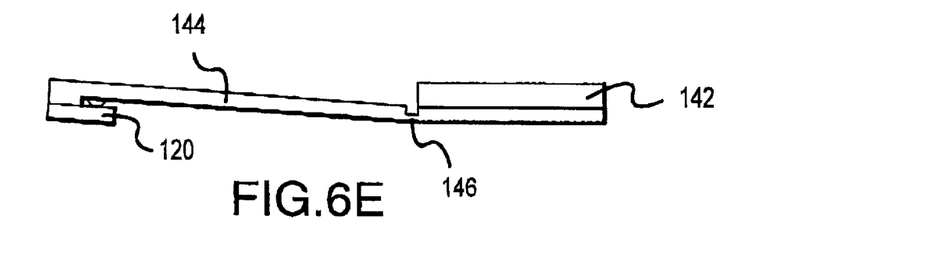

Illustrated graphically in FIG. 5, and schematically in FIG. 6, is one principle by which a preferred embodiment of the present invention generates an appropriate pre-load force on the head 118 and yet maintains a stiff bend section 146. Proper pre-load force is achieved by plastically deforming the bend section 146 of the suspension 140 so as to change the free-state position of the bend section 146 and hence the pre-load force on the head 118 while maintaining a stiff bend section having only high-frequency resonance states. As shown in FIG. 6A, the suspension 140 is manufactured, or later induced, to have an excessive downward bend (and hence a high pre-load force) at the bend section 146. Graphically, the head 118 is said to be at the baseline or free state having no deflection introduced by the user into the excessively pre-loaded bend section 146 of the suspension 140. This free state is illustrated graphically by point 164 at the origin of the Force-Distance plot shown in FIG. 5. The loadbeam 144 is back-bent from its free-state position to the desired head height, Zd (FIG. 6B). However, as can be seen graphically at point 166 in FIG. 5, the pre-load force generated by the bend section 146, Fi, is greater than the maximum allowed pre-load force (Fd) for normal disc operating conditions. As such, the loadbeam 144 is back-bent further to a point where the bend section begins to yield, i.e., plastically deform (point 167 in FIG. 5). The back-bending can be continued up to a maximum head height (Zm) and maximum force (Fmax) (represented at point 168 in FIG. 5 and in FIG. 6C). After the bend section 146 begins to yield, the loadbeam 144 is lowered back down to the desired disc height Zd as shown in FIG. 6D and at point 170 in FIG. 5. If the bend section is back bent to the proper yield position, as discussed in more detail below, the desired disc height, Zd, will correspond to the proper pre-load force, Fd. As shown by point 172 in FIG. 5 and schematically in FIG. 6E, the suspension 140 can be back-bent from the normal use position to a storage position (i.e., for storage on a ramp when the drive is powered down), as the bend section 146 does not further yield as a result of such a small movement. The height of the storage position must be below the fatigue limit of the suspension's bend section as shown at point 170 in FIG. 5. Subsequent load and unloads off the ramp move the suspension between points 170 and 172.

Multiple iterations of the suspension yielding cycle described in FIG. 5 may be required to achieve the proper pre-load force (Fd) for the desired head position (Zd). Numerous yielding cycles can be performed on the bend section 146, each cycle yielding the bend section 146 a little further so as to "dial in" the target pre-load force at the target z-height. In total—the bend section and hence the head has been "degrammed" (i.e., had a reduction in pre-load force) for the target z-height by plastically deforming the metal in the bend section. In order to minimize the space required to perform a suspension yielding cycle, the bend sections of the present invention are short. Typical bend section deflections can be as small as 2 or 3 mm in height.

Figure 7:
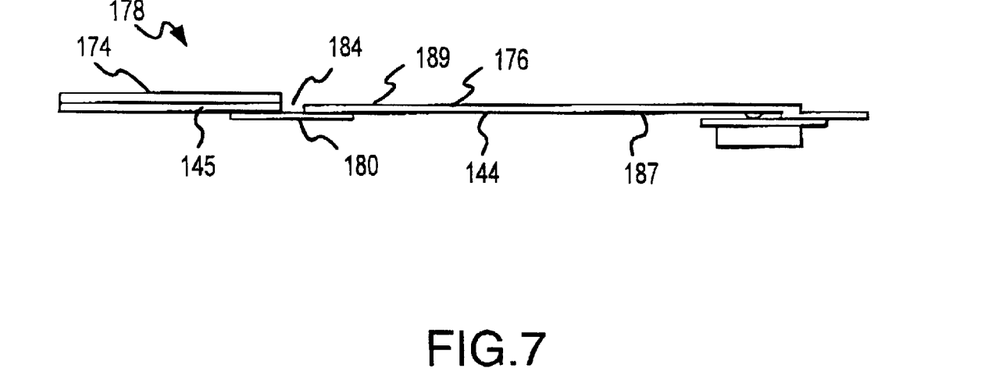
FIG. 7 is an elevated side view of a second embodiment of a suspension of the present invention showing a base-plate, loadbeam anchor sheet, loadbeam and bend section.
Figure 8:
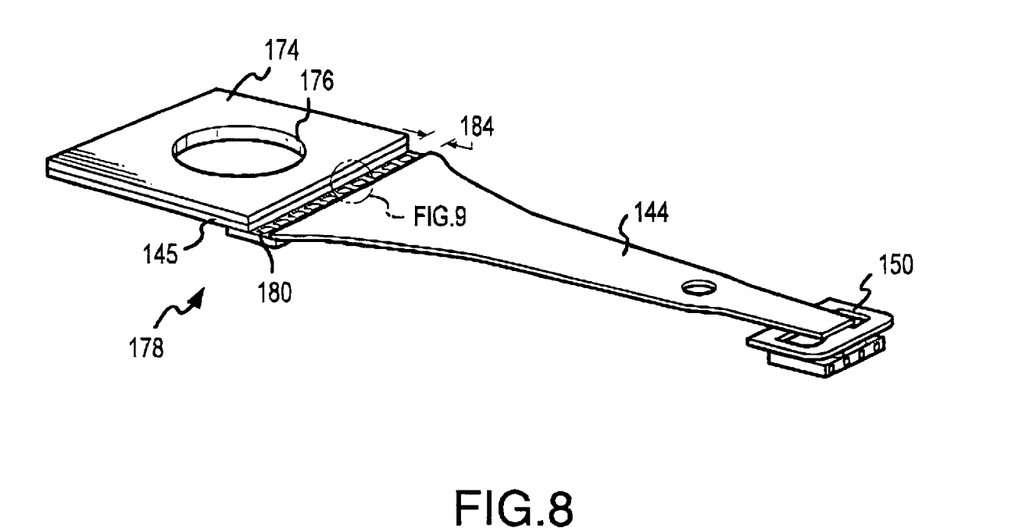
FIG. 8 is a perspective view of the suspension shown in FIG. 7 illustrating a perforated bend section.
Figure 9:
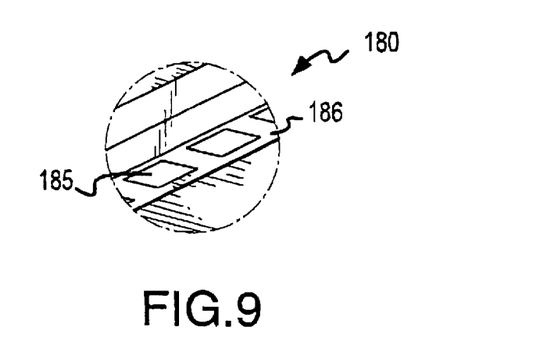
FIG. 9 is an inset showing the perforated bend section of FIG. 8.

Another embodiment of the present invention is shown in FIGS. 7–9. In this embodiment of the present invention the loadbeam 144 is separate from the loadbeam anchor sheet 145. A bend section 180 formed from a metal sheet, preferably 1 mil or greater in thickness, is used to connect the loadbeam anchor sheet 145 to the loadbeam 144. The metal sheet 180 is secured to the bottom side of the loadbeam anchor sheet 145 and either the bottom side 187 or top side of the loadbeam 144 to bridge an approximate 0.2 millimeter gap 184 between the two portions. As shown in FIG. 9, the bend section 180 is preferably cut-out or perforated 185 to define a large number of discrete equal length beams 186 within this gap 184, where the length of the beams 186 dictate the actual bending region 180 of the suspension 178. It is also envisioned that the bend section 180 could be formed from an extension of the gimbal 150 itself, where the gimbal would substantially mirror the shape of the loadbeam 144 and extend along the bottom side of the loadbeam 144 to the bottom side of the loadbeam anchor sheet. As above, the gap 184 bridged by the gimbal would be on the order of 0.2 millimeters. It should be understood that the numerical spacing distances and thicknesses used above are merely for illustrative purposes and are not meant to define the scope of the present invention. It can be expected that these numerical values will change in future disc drives.

Figure 10:
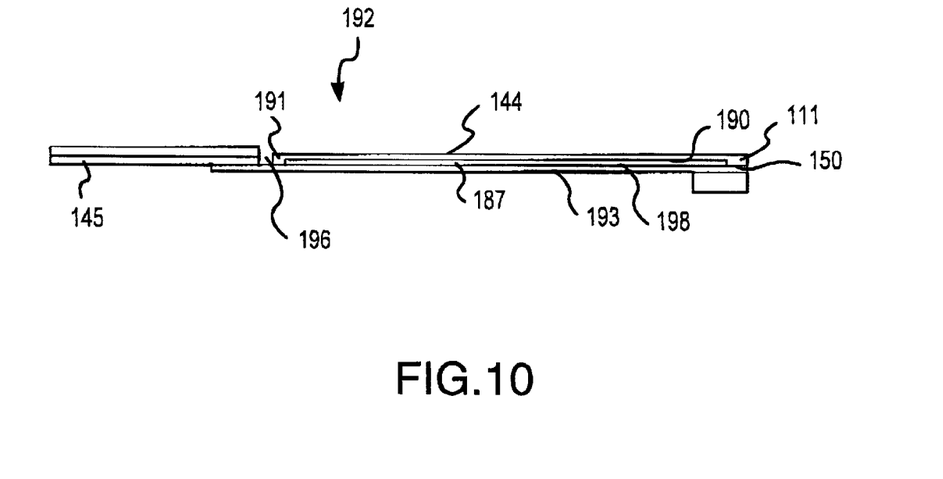
FIG. 10 is an elevated side view of a third embodiment of a suspension of the present invention showing a base-plate, etched out loadbeam, and gimbal sheet bend section.

A cross section of a third embodiment 192 of the present invention is shown in FIG. 10. In this embodiment, the interior underside 187 of the loadbeam 144 is etched or hollowed-out to form an indentation or cavity 190. The cavity has a wall 191 that surrounds the indentation and that defines the thickness of the indentation 190. A gimbal sheet 193 shaped to mimic the bottom surface of the loadbeam 144 extends from the gimbal 150 along the underside of the loadbeam 144 and attaches to the wall 191. The gap region 196 between the loadbeam anchor sheet 145 and the loadbeam 144 is bridged by the extension 193 of the gimbal 150 or by a perforated "gimbal sheet." Because the indented region 190 of the loadbeam 144 is covered by the gimbal sheet 193 it defines an enclosed hollow box-section cavity 198 having a top and walls 191 formed by the indentation and a bottom formed by the gimbal sheet 193. The reduced loadbeam mass, preferably in the rage of 50%, of this embodiment improves the resonance frequency of the suspension 192 and has little or no effect on the ability of the suspension to exert the proper pre-load force on the disc 106.

Figure 11:
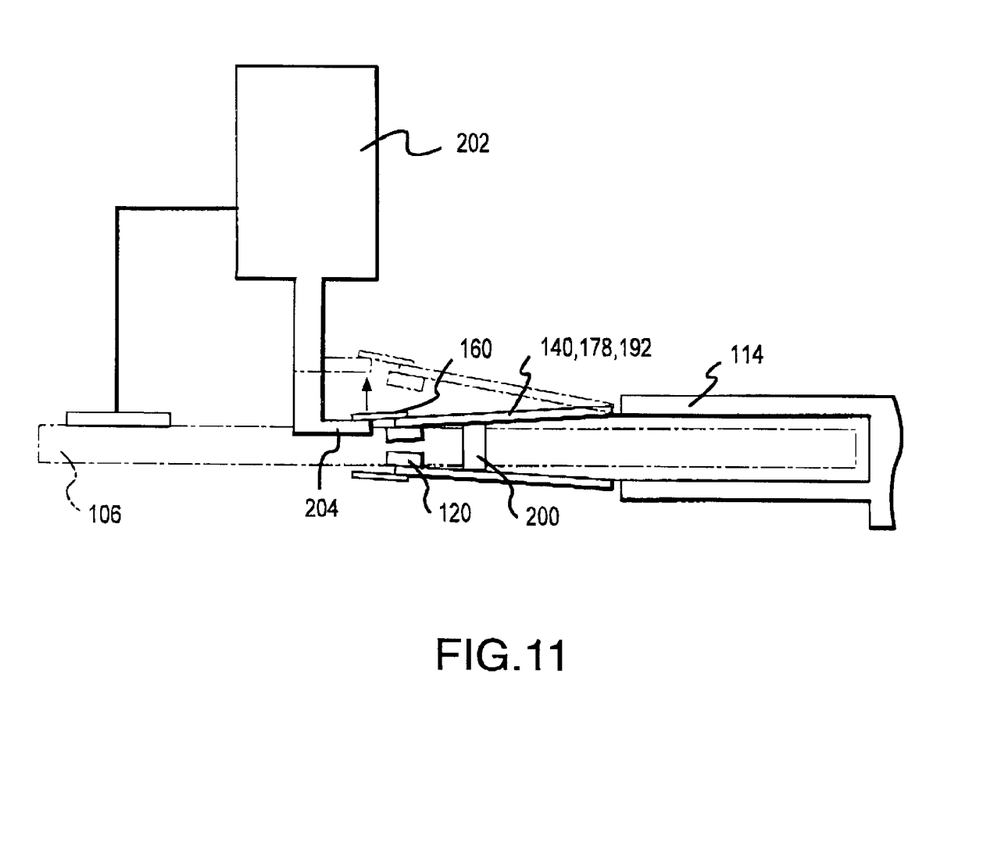
FIG. 11 is an elevated side view of a force measuring device used to perform a yielding cycle on a suspension of the present invention.

The tooling required to manufacture a disc drive incorporating a yielding bend section suspension is illustrated in FIG. 11. Suspensions 140, 178 and 192 are assembled and swaged to the actuator arm 114 as is well known in the art. During the assembly process, before the suspension has undergone plastic deformation, a separating comb 200 is inserted between the loadbeams of facing suspensions to keep the excessively pre-loaded sliders 120 from contacting each other. The comb 200 is sized and positioned to leave room for a merge comb (not shown) to be inserted for loading the slider 120 onto ramps (not shown) (for a rampload device) or discs 106 (for a contact-start-stop drive).

A force measuring device 202 is used to perform the yielding cycle described in FIGS. 5 and 6. As shown in FIG. 11, a finger 204 extending from the measuring device 202 back-bends each suspension while measuring the pre-load force exerted by the slider 120 and the z-height of the slider. It is further envisioned that the measuring device 202 could also determine the spring rate and yield point for each suspension during the back-bending procedure to optimize the process. To facilitate the engagement between the force measuring device 202 and the suspension, the ramp-load finger 160 may be used to engage the force measuring device finger 204. Alternatively, the force measuring device may engage the suspension along either of its sides. The yielding cycle described above is performed at any time after the suspension has been swaged to the actuator arm, i.e., at the head stack assembly stage or later (including once the head stack assembly has been built into the disc drive).

Component-level testing (e.g., electrical certification of the read and write heads) of a suspension incorporating embodiments of the present invention is accomplished by testing the suspension before the bend section has an excessive or overtly bent form (and hence a high pre-load force (see FIG. 6A)). As such, the component level test is accomplished as per normal with no adjustment. Once tested, the bend section is excessively bent and then plastically deformed as described above.

Figure 12:
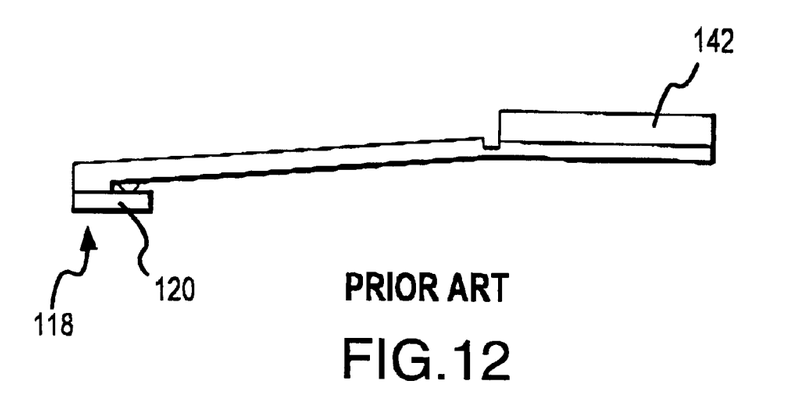
FIG. 12 is a schematic side view of a prior art suspension and attached slider illustrating a testing procedure for component level testing.
Figure 13:
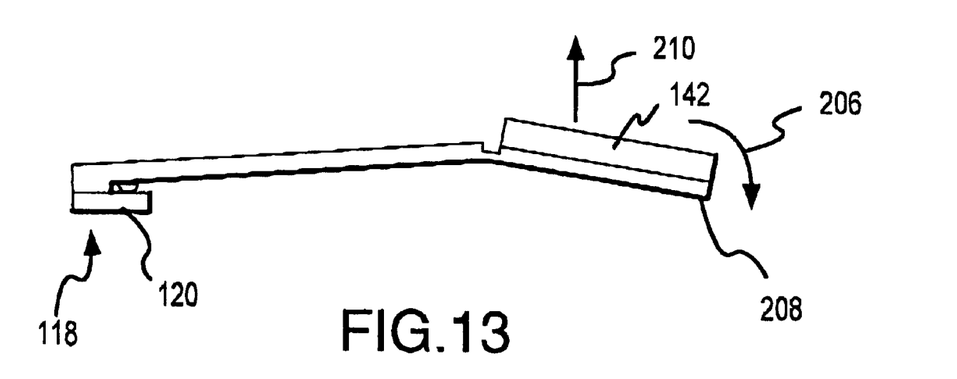
FIG. 13 is a schematic side view of an embodiment of a suspension of the present invention illustrating a rotation of the base-plate to accommodate component level testing.

Alternatively, component-level testing may be performed on suspensions bought or manufactured in an overly bent form having an excessive pre-load as described above (see FIG. 6A). These suspensions are not in a final "pre-load" state for testing because they must first be plastically deformed in the disc drive to obtain the proper z-height and pre-load force (see FIG. 5). As such, component level testing, without any adjustments, would occur on heads having a greater pre-load force than the final product in the disc drive. If the z-height is adjusted to accommodate the higher pre-load force in the component testing, the head would have an excessive pitch moment and the geometry of the load beam would be altered (as would its resonance frequencies), thereby precluding accurate testing. To overcome these problems, the base-plate and hence the loadbeam is preferably rotated clockwise (shown by arrow 206 in FIG. 13) about an axis along the pre-load bend section (i.e., toward the testing disc), until the pre-load on the head is reduced to the desired level. The base-plate may be rotated so that only a 10–16 mil clearance remains between the bottom edge 208 of the base-plate and the disc. The rotation is accomplished using a pivoting head-mounting fixture as represented by arrow 210 in FIG. 13 (compare to the normal configuration of the base-plate in FIG. 12). This ensures that the z-height and pre-load force are correct for purposes of pre-testing the heads.

Figure 14:
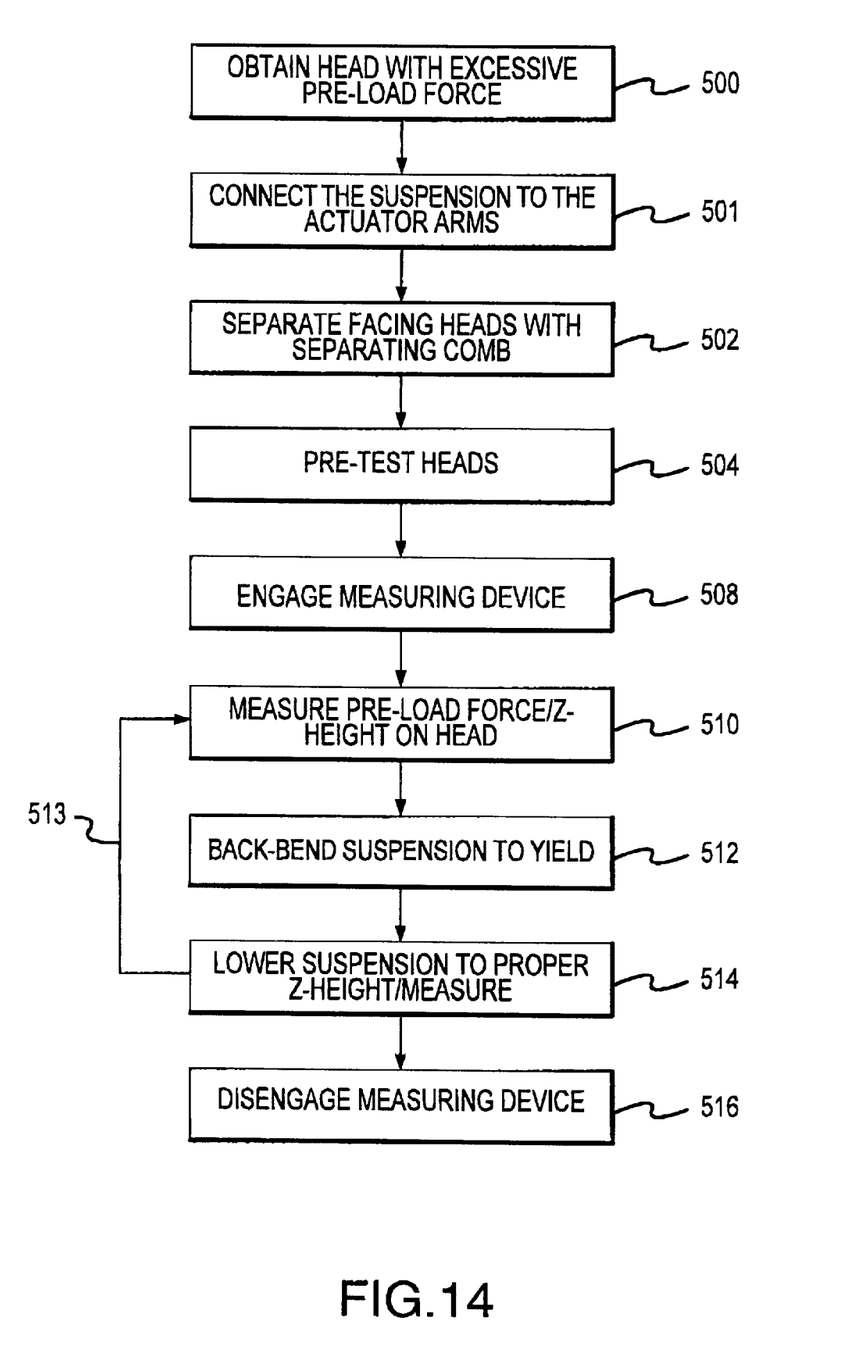
FIG. 14 is a flow chart showing the steps required to manufacture one embodiment of the present invention.

An illustrative flow diagram showing the steps required to manufacture one embodiment of the present invention is shown in FIG. 14. In operation 500, the suspension of the present invention is obtained having an excessively bent bend section that provides the head with an excessive pre-load force. In operation 501, the suspensions are swaged to the actuator arms of the E-block. In operation 502, facing suspensions are separated by a separating comb to support the suspensions and keep heads from contacting each other. In operation 504, each head is tested for precision prior to assembly in the disc drive. In operation 508, a load-sensitive force measuring device engages the distal end of each suspension. In operation 510, the load-sensitive force measuring device measures the pre-load force and z-height of each head. Additionally, other parameters such as spring-rate and yield point may also be measured. In operation 512, the load-sensitive force measuring device back-bends the bend section of the suspension to the point of yielding. The back-bending distance may be a predetermined distance. In operation 514, the suspension is lowered back down to the desired head height and the load-sensitive force measuring device measures the pre-load force on the head. This process can be repeated to successively yield the bend section a little further each time until the proper pre-load force is attained on the head, as shown by arrow 513. Once the proper head z-height and pre-load force is attained, the load-sensitive force measuring device is disengaged from the suspension in operation 516.

The scope of the present invention includes additional ways beyond yielding the bend section to generate the appropriate pre-load force on the head while the suspension is attached to the actuator arm. With reference to the stress versus strain plot shown in FIG. 5, other methods can be used to alter the excessive pre-load force exerted by the suspension on the head while maintaining the proper head-to-media spacing. One such method is to use focused heating, such as by a laser, to heat the bend section and relieve the stress. Regardless of whether heating or yielding is used on the bend section, the result is a similar "degramming" on the suspension while the suspension is attached to the actuator arm.

One of the significant aspects of the present invention is that it significantly reduces the tolerances that can be utilized in the actuator assembly and thus allows for late-stage pre-load adjustments. Only a few tolerances are unaffected by the utilization of the above embodiments of the present invention, these tolerances include: (1) the z-distance between the magnetizable medium layer and the measuring plane, approximately +/-0.5 mil; (2) the z-distance between any two disc surfaces in the same disc drive where the top disc is being used as a reference; and (3) any z-height change due to misalignment between the plane of rotation of the bearing and the plane of the discs. However, due to the tighten z-height and pre-load tolerances achieved with the present invention, less precise tolerances can be utilized in the actuator assembly for the remaining tolerances. As such, the costs of the suspension and E-block is reduced by machining suspensions and E-blocks with lower tolerances.

In summary, a preferred embodiment of the invention described herein is directed to a suspension (such as 140) for connecting a slider (such as 120) to an actuator arm (such as 114). The suspension includes a loadbeam anchor sheet (such as 145) for operative attachment to the actuator arm (such as 114), a bend section (such as 146), and a loadbeam (such as 144) having a distal end (such as 147) for operative attachment to the slider (such as 120). The bend section (such as 146) is between and connects the loadbeam anchor sheet (such as 145) to the loadbeam (such as 144), and the bend section is composed of material that has undergone a stress relief operation while the suspension is attached to the actuator arm (such as 114).

In another preferred embodiment of the invention the stress relief operation includes heating the bend section (such as 146).

In another preferred embodiment of the invention the bend section (such as 146) has an etched groove (such as 162) across the width of the loadbeam (such as 144) between the loadbeam anchor sheet (such as 145) and the loadbeam (such as 144).

In another preferred embodiment of the invention the bend section thickness under the etched groove is approximately ¼ to ⅓ the thickness of the loadbeam (such as 144).

In another preferred embodiment of the invention the etched groove (such as 162) defines a series of perforations (such as 163) through the bend section (such as 146).

In another preferred embodiment of the invention the suspension includes a separate loadbeam anchor sheet (such as 145), a bend section (such as 146), and a separate loadbeam (such as 144). The bend section (such as 146) is attached to the loadbeam anchor sheet (such as 145) and to one end of the loadbeam and spans a gap between the loadbeam anchor sheet and the loadbeam.

In another preferred embodiment of the invention a gimbal sheet (such as 193) extends from the loadbeam anchor sheet (such as 145) to the distal end (such as 147) of the loadbeam along a bottom side (such as 187) of the loadbeam (such as 144).

In another preferred embodiment of the invention the bottom side (such as 187) of the loadbeam (such as 144) is etched to form a cavity (such as 198) between the loadbeam (such as 144) and the gimbal sheet (such as 193).

Another preferred embodiment of the invention is a suspension (such as 140) for connecting a slider (such as 120) to an actuator arm (such as 114). The suspension includes a loadbeam anchor sheet (such as 145) for operative attachment to the actuator arm (such as 114), a bend section (such as 146), and a loadbeam (such as 144) having a distal end (such as 147) for operative attachment to the slider (such as 120). The bend section (such as 146) is between and connects the loadbeam anchor sheet (such as 145) to the loadbeam (such as 144), and the bend section is plastically deformed while the suspension is attached to the actuator arm (such as 114).

Another preferred embodiment of the invention is directed to a disc drive (such as 100) having an information storage disc (such as 106) rotatably mounted on a spin motor (such as 104). The disc drive includes an actuator arm (such as 114) for directing a slider (such as 120) over a surface of the information storage disc (such as 106) and a suspension (such as 140) that includes a loadbeam (such as 144) supporting the slider (such as 120) and a pre-loaded bend section (such as 146) connected to the actuator arm (such as 114) and to the loadbeam. The bend section has undergone a degramming process to increase resonance frequencies of the loadbeam while the suspension is attached to the actuator arm.

In another preferred embodiment of the invention the degramming process comprises heating the bend section.

In another preferred embodiment of the invention the degramming process comprises plastically deforming the bend section.

Another preferred embodiment of the present invention is a method of performing a pre-load adjustment on a transducer (such as 118) suspension (such as 140) for use in a disc drive (such as 100). The suspension has a loadbeam anchor sheet (such as 145), a bend section (such as 146) and a loadbeam. The loadbeam has a slider attached to its distal end (such as 147). The method includes attaching the loadbeam anchor sheet of the suspension to an actuator arm of an E-block (such as 113) to form part of the actuator assembly (such as 110). (such as in step 501). Next the pre-load force is measured on the suspension on the actuator arm (such as in step 510) and the suspension is back-bent until the bend section yields (such as in step 512). Finally, the suspension is measured for the pre-load force (such as in steps 514).

In another preferred embodiment of the invention, the method further includes lowering the suspension to a desired disc z-height and measuring the pre-load force on the slider at the desired disc z-height (such as in step 514).

In another preferred embodiment of the invention, the method further includes repeating the back-bending, measuring and lowering steps of the method until a pre-selected pre-load force is obtained at the desired disc z-height.

In another preferred embodiment of the invention, the method further includes attaching a second suspension having a loadbeam and a slider attached to a distal end of the loadbeam to a second actuator arm of the E-block to form another part of the actuator assembly. Next, a pre-load force is measured on the second suspension on the second actuator arm and the second suspension is back-bent until the second bend section yields. The pre-load of the second suspension is measured.

In another preferred embodiment of the invention, the method further includes positioning a separating comb between the two suspensions to prevent the two sliders from contacting each other (such as in step 502).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method of increasing resonance frequencies of a disc drive suspension comprising:
   (a) placing the suspension within the disc drive adjacent a disc surface, the suspension having a bend section adapted to direct one end of the suspension toward the disc; and
   (b) back-bending the suspension away from the disc surface to plastically deform the bend section.

2. A suspension connecting a slider to an actuator arm of an actuator assembly mounted in a disc drive, the actuator assembly adapted to rotate the slider over a surface of a disc within the disc drive, wherein the suspension comprises:
   a load beam anchor sheet connected to an end of the actuator arm;
   a load beam having a distal end attached to the slider; and
   a bend section connecting the load beam anchor sheet to a proximal end of the load beam to provide a pre-load force to the slider in the direction of the disc surface, wherein the distal end of the load beam and the attached slider are back-bent a predetermined distance in a direction away from the disc surface to plastically deform the bend section so as to adjust the pre-load force while the suspension is attached to the actuator arm within the disc drive.

3. The suspension of claim 2 wherein the predetermined distance is no greater than 3 millimeters.

4. The suspension of claim 2 wherein:
   the distal end of the load beam includes a ramp-load finger extending distally beyond the slider; and
   the load beam and the attached slider are back-bent by the application of a force to the ramp-load finger.

5. The suspension of claim 2 wherein:
   the load beam anchor sheet, the load beam and the bend section are formed from a single piece of metal; and
   the bend section is formed as an etched groove between the load beam anchor sheet and the load beam.

6. The suspension of claim 5 wherein a length dimension of the etched groove between the load beam anchor sheet and the proximal end of the load beam is approximately 0.2 millimeters.

7. The suspension of claim 5 wherein the etched groove is perforated to form a plurality of equal-sized beams extending across an entire width of the bend section.

8. The suspension of claim 2 wherein the load beam anchor sheet, the load beam and the bend section are each formed from separate metal sheets with one end of the bend section attached to the load beam anchor sheet and an opposite end of the bend section attached to the proximal end of the load beam, wherein the bend section spans a predetermined gap between the load beam anchor sheet and the proximal end of the load beam.

9. The suspension of claim 8 wherein the predetermined gap is approximately 0.2 millimeters.

10. The suspension of claim 2 wherein the load beam anchor sheet and the load beam are each formed from separate metal sheets, and wherein the suspension further comprises:
    a gimbal sheet attached to a bottom surface of the load beam and extending along substantially an entire length of the load beam, the gimbal sheet having a distal end attached to the slider and a proximal end attached to a bottom surface of the load beam anchor sheet, and wherein the bend section comprises a portion of the gimbal sheet spanning a predetermined gap between the load beam anchor sheet and the proximal end of the load beam.

11. The suspension of claim 10 wherein the bottom surface of the load beam is etched to form a cavity between the load beam and the gimbal sheet.

12. A disc drive having an information storage disc rotatably mounted on a spin motor, the disc drive comprising:
    an actuator assembly having an actuator arm for directing a slider over a surface of the information storage disc; and
    a suspension connected between the actuator arm and the slider to provide a pre-load force to the slider in the direction of the disc surface, wherein the suspension comprises:
       a load beam anchor sheet connected to an end of the actuator arm;
       a load beam having a distal end attached to the slider; and
       a bend section connecting the load beam anchor sheet to a proximal end of the load beam to provide the pre-load force to the slider, wherein the distal end of the load beam and the attached slider are back-bent a predetermined distance in a direction away from the disc surface to plastically deform the bend section so as to adjust the pre-load force while the suspension is attached to the actuator arm within the disc drive.

13. The disc drive of claim 12 wherein the predetermined distance is no greater than 3 millimeters.

14. The disc drive of claim 12 wherein:
    the distal end of the load beam includes a ramp-load finger extending distally beyond the slider; and
    the load beam and the attached slider are back-bent by the application of a force to the ramp-load finger.

15. The disc drive of claim 12 wherein:
    the load beam anchor sheet, the load beam and the bend section are formed from a single piece of metal; and
    the bend section is formed as an etched groove between the load beam anchor sheet and the load beam.

16. The disc drive of claim 15 wherein a length dimension of the etched groove between the load beam anchor sheet and the proximal end of the load beam is approximately 0.2 millimeters.

17. The disc drive of claim 15 wherein the etched groove is perforated to form a plurality of equal-sized beams extending across an entire width of the bend section.

18. The disc drive of claim 12 wherein the load beam anchor sheet, the load beam and the bend section are each formed from separate metal sheets with one end of the bend section attached to the load beam anchor sheet and an opposite end of the bend section attached to the proximal end of the load beam, wherein the bend section spans a predetermined gap between the load beam anchor sheet and the proximal end of the load beam.

19. The disc drive of claim 18 wherein the predetermined gap is approximately 0.2 millimeters.

20. The disc drive of claim 12 wherein the load beam anchor sheet and the load beam are each formed from separate metal sheets, and wherein the suspension further comprises:
    a gimbal sheet attached to a bottom surface of the load beam and extending along substantially an entire length of the load beam, the gimbal sheet having a distal end attached to the slider and a proximal end attached to a bottom surface of the load beam anchor sheet, and wherein the bend section comprises a portion of the gimbal sheet spanning a predetermined gap between the load beam anchor sheet and the proximal end of the load beam.

21. The disc drive of claim 20 in the predetermined gap is approximately 0.2 millimeters.

22. The disc drive of claim 20 wherein the bottom surface of the load beam is etched to form a cavity between the load beam and the gimbal sheet.

23. A method of adjusting a pre-load force applied to a slider in the direction of an information storage disc within a disc drive, the method comprising steps of:

(a) attaching a suspension to an actuator arm of an actuator assembly, the suspension including a load beam having a distal end attached to the slider and a bend section for applying the pre-load force to the distal end of the load beam;

(b) positioning the actuator assembly within the disc drive adjacent the information storage disc; and (c) back-bending the distal end of the load beam a predetermined distance in a direction opposite the pre-load force until the bend section undergoes a plastic deformation.

24. The method of claim 23 wherein:

the distal end of the load beam includes an elongated finger for engaging a ramp; and the back-bending step (c) further comprises applying a lifting force to the finger to raise the distal end of the load beam the predetermined distance.

25. The method of claim 23 further comprising the step of:

(d) measuring the pre-load force prior to the back-bending step (c) to determine the predetermined distance to back-bend the distal end of the load beam.

26. The method of claim 25 wherein the predetermined distance is no greater than 3 millimeters.

* * * * *